United States Patent [19]

Dalton et al.

[11] 4,276,565
[45] Jun. 30, 1981

[54] METHOD AND APPARATUS FOR STANDARDS CONVERSION OF TELEVISION SIGNALS

[75] Inventors: Christopher J. Dalton, High Wycombe; Graham D. Roe, Great Missenden, both of England

[73] Assignee: British Broadcasting Corporation, London, England

[21] Appl. No.: 3,451

[22] Filed: Jan. 15, 1979

[30] Foreign Application Priority Data

Jan. 18, 1978 [GB] United Kingdom ................ 2068/78

[51] Int. Cl.³ ............................................. H04N 5/02
[52] U.S. Cl. ................................................... 358/140
[58] Field of Search ........................ 358/140, 11, 78, 7, 358/9, 162, 166, 136, 127; 360/11, 10, 33, 35

[56] References Cited

U.S. PATENT DOCUMENTS

| 3,863,023 | 1/1975 | Schmersal et al. | 358/240 |
| 3,970,776 | 7/1976 | Kinuhata et al. | 358/140 |

FOREIGN PATENT DOCUMENTS

| 1191500 | 5/1970 | United Kingdom . |
| 1326386 | 8/1973 | United Kingdom . |
| 1362191 | 7/1974 | United Kingdom . |
| 1391434 | 4/1975 | United Kingdom . |
| 1525915 | 9/1978 | United Kingdom . |

OTHER PUBLICATIONS

"Television Standards Converter Using Digital Techniques," *The Radio and Electronic Engineer*, vol. 43, No. 3, pp. 230–232.
Kuruma et al., "Digital Fields Store Television Standards Converter," *International Broadcasting Convention*, 23–27, Sep. 1974, pp. 104–113.
Kinuhata et al., "A Digital Standards-Converter for Television Using Intra-Frame Line Interpolation Techniques," IEEE International Conference on Communications, Minneapolis, Jun. 17–19, 1974, pp. 701–705.
Clarke et al., "Developments in Standards Conversion," International Broadcasting Convention, Sep. 25–29, 1978, pp. 202–205, London.

*Primary Examiner*—John C. Martin
*Attorney, Agent, or Firm*—Robert F. O'Connell

[57] ABSTRACT

A method of and apparatus for simultaneously enabling different parts of an input television signal to be made available is used as a television standards converter. Successive lines of an input television signal are cyclically written into n (eg 4) sucessive random access store sections, using in each cycle the same addresses for the different sections. The write addresses are incremented for sucessive cycles. The sections are read from using for each section addresses which are related to each other and to the write addresses so as to access a desired set of up to n sucessive lines. These lines are combined by weighted addition to provide an interpolated output line. The read addresses are derived by counting the desired output lines during each field and multiplying the count by the line conversion ratio. The integral part of the resultant controls the read addresses and the non-integral part controls the weighted addition. A total storage of two fields is used, each divided into sections. Standards conversion to either higher or lower lines rates is possible with improved quality.

24 Claims, 3 Drawing Figures

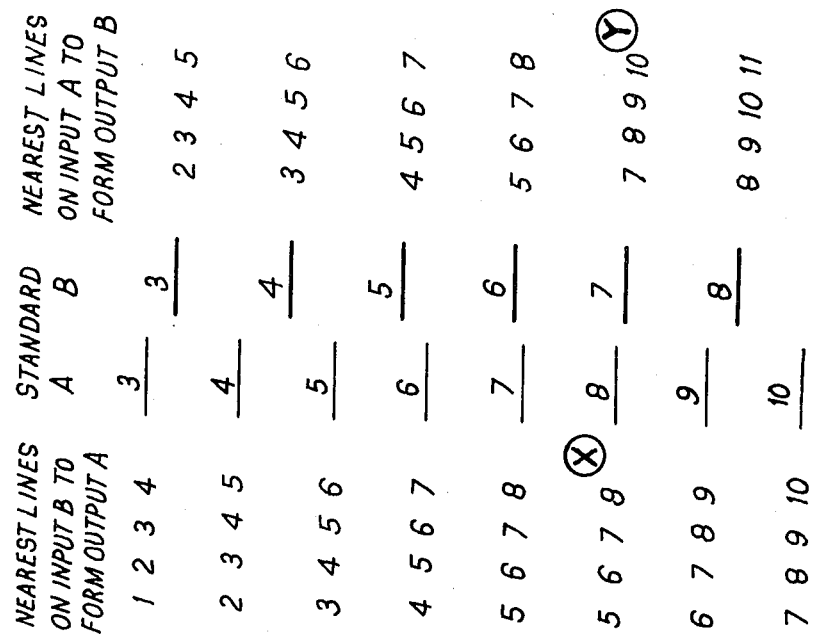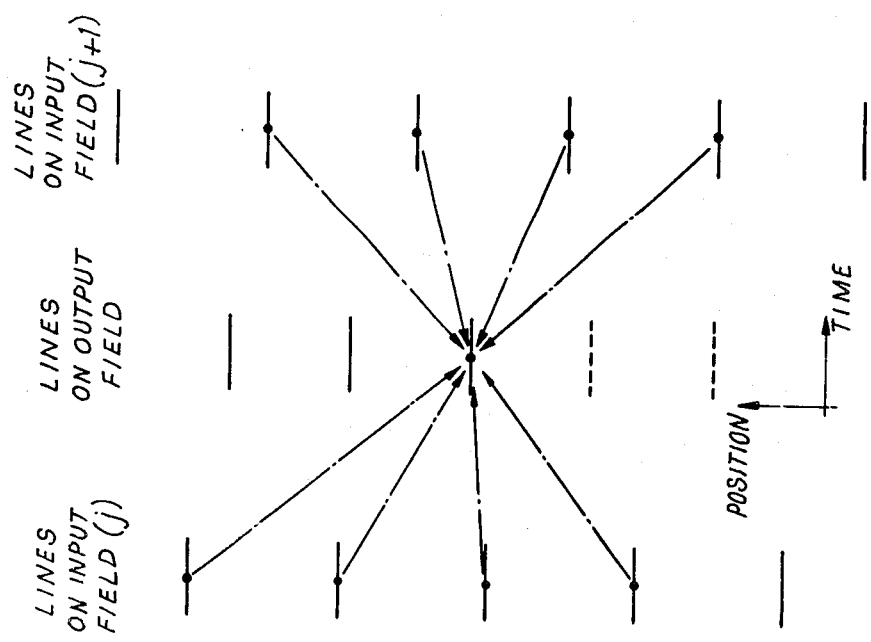

METHOD AND APPARATUS FOR STANDARDS CONVERSION OF TELEVISION SIGNALS

This invention relates to a method of and apparatus for processing television signals. The invention is particularly, though not exclusively, applicable to standards conversion for converting between different line, or line and field, standards.

To convert between television signals on different standards, each picture point on the output is formed by using the nearest available information from the input signal. To identify the output point in space and time, contributions from several lines and several fields are ideally required, the number and relative proportions of these contributions being selected to optimise the subjective appearance of the output picture. This technique is known as interpolation.

This is one example of a situation where it is necessary to provide simultaneously more than one point in a stored television field or number of fields.

Existing converters use some form of field storage capable of storing 2 to 3 fields, and some additional line storage to give access to several lines at the same time. Thus the two interpolation operations are separated, namely line interpolation for position, and field interpolation for time.

We have found that the final picture quality resulting from such a system is bound to be inferior to one in which the complete interpolation is carried out in one operation. This is because combined interpolation permits independent determination of the response at multiple points in the two-dimensional temporal/vertical response plane. The concept of this two-dimensional sampling theory is introduced in a paper by J. O. DREWERY in B.B.C. Engineering No. 104, September 1976, see particularly pages 15 to 24.

Furthermore, the relative position between lines on the input and output standards is continually changing, and the pattern of input line numbers required for line interpolation to produce each output line is not regular. When converting from an input standard with a lower number of lines than the output standard, there will be times where it is necessary to take different proportions of the same group of input lines to form two successive output lines. In the existing converters this is generally achieved by providing each of the separate line storage elements with means for recirculating the stored information, and temporarily stop read out from the field store. When converting in the opposite direction, from a higher to a lower number of lines, points will arise where it is necessary to introduce two new input lines simultaneously. This facility is not generally available on existing converters, some of which avoid the difficulty when operating in this direction of conversion by carrying out the line interpolation before the field store, and delaying writing into the field store until the required information becomes available. This requires a major rerouting of signal paths within the converter as between the two directions of conversion.

With a view to enabling these problems to be more readily overcome, this invention is concerned to provide an improved or alternative system for enabling different parts of the field of a television signal to be made available simultaneously.

Accordingly this invention provides a method of an apparatus for simultaneously enabling different parts of an input television signal to be made available, in which successive portions (e.g. lines) of the input television signal are cyclically written into a plurality of (n) successive random access store sections, using in each cycle addresses for the different sections which are unambiguously related, the addresses being incremented for successive cycles, and the sections are read from using for each section addresses which are related to each other and to the write addresses so as to access a desired set of stored signal portions, (eg. lines).

Conveniently the write addresses for all the store sections are the same for one cycle. If the read addresses are appropriately chosen, n successive lines can be made available simultaneously.

A preferred embodiment of the invention is in the form of a standard converter in which the outputs read from the store sections are combined in a weighted addition to provide an interpolated output signal. The said portions are each a television lines and a total storage equal to two fields is provided, each field of which is divided into cyclically addressed sections as described above. The write addresses are derived by counting the input lines. The read addresses are particularly conveniently derived as follows. The desired output lines are counted during each output field in a counter, and the line count is multiplied by the line conversion ratio, that is the ratio of the number of lines in each input field divided by the number of lines in each output field. The integral part of the resultant will indicate which is the next adjacent input line to the desired output line, and the non-integral part will indicate how close that input line is. Thus the former can be used to control the read addresses, and the latter used to control the weighting of the lines read from the store.

The invention will now be described in more detail, by way of example, with reference to the drawings, in which:

FIG. 1 illustrates the contributions from the input lines of two fields to locate an output point correctly in time and space;

FIG. 2 shows groups of input lines required to make each output line in the two directions of conversion.

Figure 3:
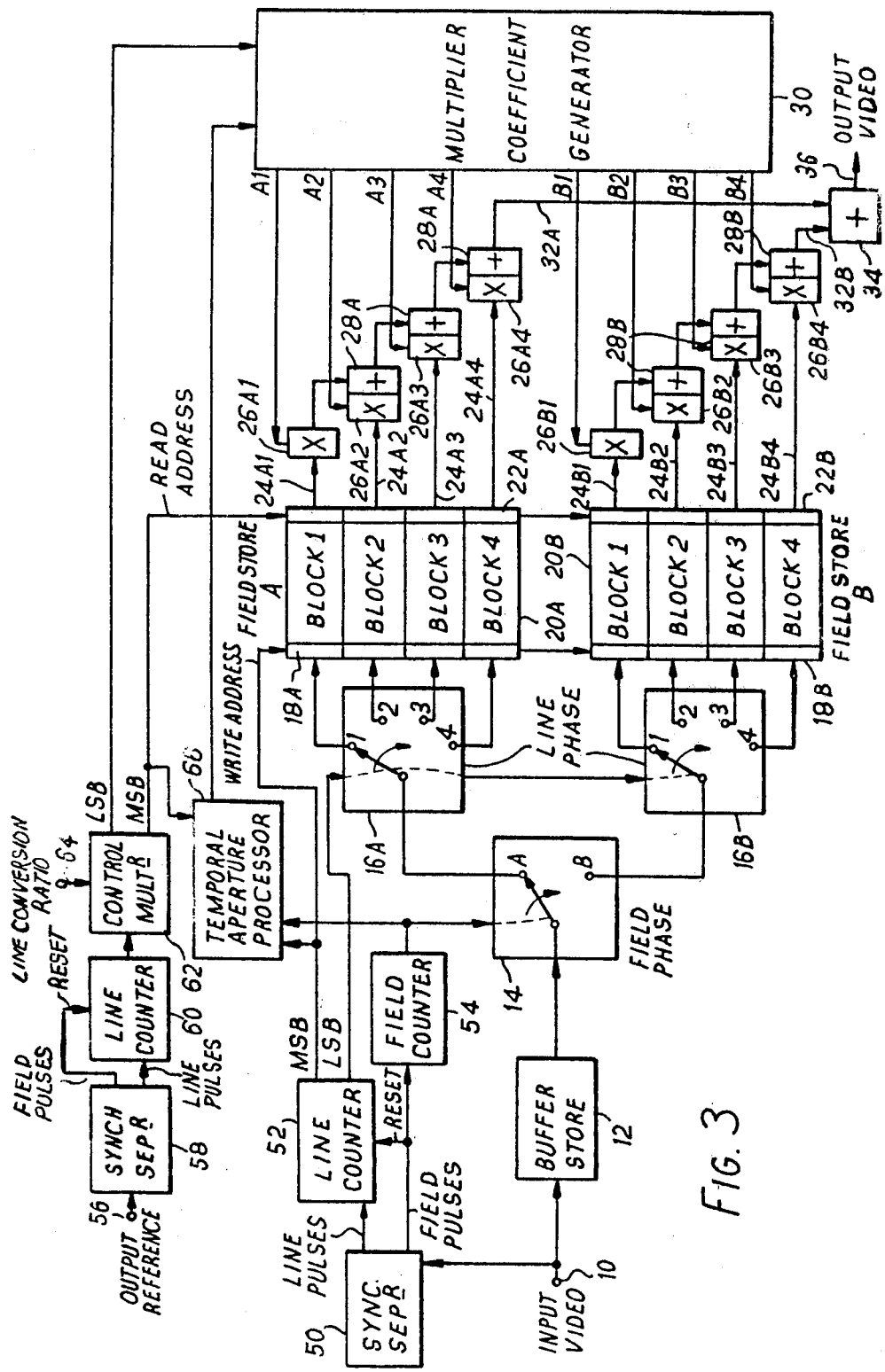
FIG. 3 is a block circuit diagram of a television standards converter embodying the invention.

The following description will be made with reference to an interpolation system in which interpolation is made using four lines from each of two input fields. It will be appreciated, however, that this is simply one example and that in general interpolation can be made using n lines from m fields, where n and m are integers and $n \geq 2, m \geq 1$.

FIG. 1 shows the situation where two input fields and four lines on each field are used to generate an output line which is required to be spatially located between the two input fields. In this case it is assumed that there are more output lines per field than input lines, but this is immaterial.

FIG. 2 illustrates conversion between two standards A and B, where A has more lines than B in each field. The figure shows for each input field those lines which are needed, assuming a four line wide interpolation aperture, to form a line of the output field. On the left of the figure are given the lines of a field at the standard B required to form individual lines of the standard A. Thus this illustrates conversion in the direction of increasing the number of lines. At the point marked Ⓧ there are two output lines, numbers 7 and 8, which fall in the interval between two input lines, numbers 6 and 7.

Thus output lines 7 and 8 must be generated from the same set of four input lines, but with different proportions of the input lines being taken.

On the right of FIG. 2 are given the lines of a field at the standard A required to form individual lines of the standard B. Thus this illustrates conversion in the direction of decreasing the number of lines. At the point marked $\widehat{Y}$, which is likewise at lines 6 and 7 of the standard B, there is a point where it is necessary to introduce two new lines of the input standard A, namely lines 7 and 8. That is to say that the set of lines 6, 7, 8 and 9 is not used but is omitted from the steady sequence, which jumps from 5, 6, 7 and 8 to 7, 8, 9 and 10.

Reference will now be made to FIG. 3 which is a block circuit diagram of a digital television standards converter which embodies the invention. The converter has a video input 10 for receiving a digital television signal at an input standard and which is connected to a buffer store 12. The buffer store 12 which may take the form of a FIFO asynchronous shift register (eg Monolithic Memories type 67401), absorbs the frequency difference between the digital clocking or sample rates of the input and output video waveforms, and also makes any small changes which are required to the duration of the active period of the television lines. From the buffer store 12 the signal passes to a field phase switch 14, which cyclically applies the fields of the signal to m outputs, in this case two, labelled A and B. The A output of switch 14 is applied to a line phase switch 16A which has n outputs, in this case four, numbered 1, 2, 3 and 4. The switch 16A cyclically applies the lines of the signal received by it to its four outputs. A field store A referenced 20A in the form of a random access store is connected to the four outputs of switch 16A. The field store is divided into n (=4) sections labelled Blocks 1, 2, 3 and 4. Associated with the inputs to he blocks is write addressing circuitry 18A which controls the location at which information is stored within each block. Associated with the outputs of the blocks is read addressing circuitry 22A which controls the location from which information is read from each block. Each block has its own output 24A1 to 24A4 respectively, and to each output is connected a multiplier 26A1 to 26A4 respectively. The other input of each multiplier is connected to a respective output of a multiplier coefficient generator 30 which takes the form of a programmable read only memory (PROM). The outputs of the multipliers 26A are summed by three adders 28A connected as shown. The resultant output 32A is then applied to one input of a final adder 34. It will be appreciated that other circuit configurations can be used to add the store outputs with the required weights specified by the coefficient generator 30.

To the output B of the field phase switch 14 is connected an identical series of circuit elements, which are accordingly referenced with the letter B. These comprise a line phase switch 16B, random access field store 20B having four blocks with write addressing circuitry 18B and read addressing circuitry 22B, output lines 24B1 to 24B4, multipliers 26B1 to 26B4 connected to respective lines 24B1 to 24B4 on the one hand and to respective outputs B1 to B4 of the multiplier coefficient generator 30 on the other, and adders 28B providing an output on line 32B which is applied to the other input of adder 34. The output 36 of the adder 34 constitutes the video output of the converter.

The converter as thus-far described operates as follows. It is seen that each field store 20 is divided into four sections, so that there can be four simultaneous read outputs. During the writing process, for each field received by switch 16A (for example), successive lines of the input signal are cyclically written in turn into the successive blocks of the store 20A. Thus line 1 is written into block 1, line 2 into block 2, line 3 into block 3, line 4 into block 4, line 5 again into block 1, line 6 into block 2, and so on. In the general case, therefore, line $4i+1$ is written into block 1, line $4i+2$ into block 2, line $4i+3$ into block 3, and line $4i+4$ into block 4 (i being an integer). Each block has a capacity of at least one quarter of the number of lines in an input field, rounded up to the next integer, and each line is separately addressable. For each cycle of switch 16A, that is for each value of i, the same store address can be used to denote corresponding locations in each block. Thus the write address received by the circuitry 18A remains constant during each cycle and increments by one at the end of each cycle, afer block 4.

To gain access to a group of four successive input lines for interpolation, each block or section of the store has an independent output 24A. The read address circuitry 22A simultaneously addresses one input line of each of the four blocks to provide four lines. Normally for output line $4i'$, each block is addressed with the same address $i'$. For line $4i'+1$, block 1 is addressed with the address $i'+1$, and the remaining blocks 2 to 4 are addressed with address $i'$. For the next subsequent line $4i'+2$, blocks 1 and 2 are addressed with the address $i'+1$, and blocks 3 and 4 are addressed with the address $i'$. This continues cyclically, such that the address change "ripples through" the sections of the store as each successive group of stored input lines is read to form an output line.

It will be seen therefore that the problems arising at points $\widehat{X}$ and $\widehat{Y}$ on FIG. 2 can readily be overcome by altering the steady sequence of the read addresses. To repeat a line as required at $\widehat{X}$, all that is necessary is to fail to alter the read addresses between one output line and the next. To make a jump as required at $\widehat{Y}$, the read address for the next two blocks are both incremented simultaneously.

The operation as applied above can be applied in parallel to two successive input fields simultaneously. The same write and read addresses can be used in the two field stores 20A and 20B, although the multiplier coefficients will differ. The totals of the weighted contributions from the two fields are summed in the adder 34.

It should be noted that while the field and line phase switches 14, 16A and 16B have been illustrated as mechanical switches, normally they will be implemented electronically. For example the input to switch 14 may be applied to all eight store sections, but the control signals shown as applied to the switches are used to enable writing into only the section which is appropriate at that particular time. Also, the outputs of the blocks are preferably subjected to a small but successively increasing delay, as to compensate for the delays in the chain of adders 28. The buffer circuit 12 is only required when, as here, the field stores 20A and 20B write and read on the same clock frequency. The buffer store is not required if the stores have asynchronous capability.

A number of advantages result from the construction of the converter described. These include the following:

(1) Combined line and field interpolation is achieved.
(2) No separate line delays are required. This results in a cheaper and simpler store.
(3) There is no necessity to separate the line (positional) and field (temporal) interpolation functions or interchange their order when reversing the direction of conversion.
(4) Simple control logic will allow complete freedom to repeat groups of lines or jump forward in the sequence.
(5) The ability exists to provide timing offsets (delays) between store section outputs to simplify 'ripple adding' after the interpolation multipliers 26.
(6) There is no complicated signal path switching when changing direction of conversion.
(7) Storage of complete fields of the input standard allows greater flexibility in dealing with input signal irregularities.

The control circuitry for the converter will now be described with further reference to FIG. 3. Also connected to the input terminal 10 is a synchronising (sync.) pulse separator 50 which provides, over two respective outputs, pulses at the field frequency and pulses at the line frequency, these pulses in each case occurring between lines at the start of each field and line respectively. The line frequency pulses are applied to a line counter 52 which has a first or most significant bits (MSB) output which indicates the next lowest multiple of 4 to the current line number (i.e. the value i above), and a second or least significant bits (LSB) output which indicates the difference between the current line number and the said multiple of 4. The LSB output indicates the block to which the current line is to be applied, and is accordingly used to control the switches 16A and 16B. The MSB output indicates the current write address and is accordingly applied to the write addressing circuitry 18A and 18B of the stores 20A and 20B.

The field frequency pulses from sync. separator 50 are applied to a field counter 54 (in principle simply a bistable flip-flop circuit) the output of which controls the field phase switch 14. The field frequency pulses are also used to reset to zero the line counter 52.

An input 56 receives in any convenient form an output reference signal. If this is in full video form, then a sync. separator 58, similar to the separator 50, is used to provide line and field frequency pulses with the required output timing. A second line counter circuit 60 counts the line pulses and is reset to zero by each field pulse. The line count is applied to a control multiplier 62 which receives from an input 64 a signal representing the ratio of the number of lines in a field of the input line standard divided by the number of lines in a field of the output line standard. (This could be derived from the signals at inputs 10 and 56). The result of this multiplication specifies the relation of the current output line to the input lines. The integral part of the resultant, the MSB output of multiplier 62, specifies the nearest stored input line above the output line required and is accordingly applied to the read addressing circuitry 22A and 22B of the stores 20A and 20B. The fractional part, or residue, represents the distance between the output line and the adjacent input lines and is accordingly applied to the multiplier coefficient generator 30. As the conversion proceeds, the repeats and jumps denoted by ⓧ and ⓨ in FIG. 2 in the series of addresses for the stored lines appear as a natural consequence of the multiplication process.

Finally, a temporal aperture processor 66 receives the input field frequency pulses from counter 54, the MSB output of input line counter 52, and the MSB output of the multiplier 62, and determines the time instant which is midway between the earliest and latest information available to be read from the store. The output of processor 66 defines the remainder of the address for the set of interpolation coefficients and is thus also applied to the coefficient generator 30. The temporal address is obtained by comparing the input line number with the quotient of the multiplication on the MSB output of multiplier 62. This comparison will show whether the lines read from the field being written are 'old' or 'new'. The coefficient set is also defined by the current input line number since the centre of the aperture is at a time one half the total storage before the current writing point. The coefficient are read out from the generator 30 line-by-line into buffer registers associated with the individual multipliers 26.

In principle the method described above can be applied to converters which use only one field store, the other field store being omitted. The invention then enables the simultaneous availability of and hence interpolation between successive lines of a single field. Conversely the method can be extended to include more than two fields, to enable interpolation between successive pictures of an interlaced-field standard for example.

What we claim is:

1. A method of simultaneously enabling different parts of an input video signal to be made available, using signal storage, comprising the steps of:
   cyclically writing successive portions of the input video signal relating to successive portions of the video picture into a plurality of successive random access store sections, each of which is capable of storing several video lines but less than one field, using in each cycle write addresses for the different sections which are unambiguously related;
   incrementing the write addresses for successive cycles; and
   reading from the sections using for each section read addresses which are related to each other and to the write addresses so as to access a desired set of stored signal portions.

2. A method according to claim 1, wherein each signal portion is a video signal line.

3. A method according to claim 1, wherein the write addresses for all the store sections are the same for one cycle.

4. A method according to claim 3, wherein the read addresses are so chosen that several successive lines, equal in number to the number of store sections, are made available simultaneously.

5. A method according to claim 1, wherein a total storage of two fields or pictures is provided, each field of which is divided into store sections.

6. A method according to claim 1, wherein several outputs read from the store sections are combined in a weighted addition to provide an interpolated output signal.

7. A method according to claim 6, wherein the weighting is controlled by counting the desired output lines during each output field, multiplying the count by the line conversion ratio, and controlling the weighting in dependence upon the non-integral part of the resultant.

8. A method according to claim 1, wherein the read addresses are derived by counting the desired output lines during each output field, multiplying the count by the line conversion ratio, and selecting the read address in dependence upon the integral part of the resultant.

9. Apparatus for simultaneously enabling different parts of an input video signal to be made available and comprising
    signal storage means, the signal storage means comprising
        a plurality of random access store sections;
        writing means for cyclically writing successive portions of the input video signal relating to successive portions of the video picture into successive random access store sections, each of which is capable of storing several video lines but less than one field, using in each cycle write addresses for the different sections which are unambiguously related;
    means for incrementing the write addresses for successive cycles; and
    reading means for reading from the sections using for each section read addresses which are related to each other and to the write addresses so as to access a desired set of stored signal portions.

10. Apparatus according to claim 9, wherein there is a total storage of two fields or pictures, each field of which is divided into store sections.

11. Apparatus according to claim 9, including means for combining several outputs from the store sections in a weighted addition to provide an interpolated output signal.

12. Apparatus according to claim 11, including a counter for counting the desired output lines during each output field, a multiplier for multiplying the count by the line conversion ratio, and means for controlling the weighting performed by the combining means in dependence upon the non-integral part of the multiplier output.

13. Apparatus according to claim 9, including a counter for counting the desired output lines during each output field, and a multiplier for multiplying the count by the line conversion ratio, and wherein the reading means selects the read address in dependence upon the integral part of the multiplier output.

14. A method of simultaneously enabling different parts of an input video signal to be made available, using signal storage, comprising the steps of
    cyclically writing successive portions of the input video signal relating to successive portions of the video picture into a plurality of successive random access store sections, using in each cycle write addresses for the different sections which are unambiguously related, the write addresses for all the store sections being the same for one cycle,
    incrementing the write addresses for successive cycles; and
    reading from the sections using for each section read addresses which are related to each other and to the write addresses so as to access a desired set of stored signal portions.

15. A method of simultaneously enabling different parts of an input video signal to be made available, using signal storage, comprising the steps of
    cyclically writing successive portions of the input video signal relating to successive portions of the video picture into a plurality of successive random access store sections, using in each cycle write addresses for the different sections which are unambiguously related;
    incrementing the write addresses for successive cycles; and
    reading from the sections using for each section read addresses which are related to each other and to the write addresses so as to access a desired set of stored signal portions, the read addresses being serived by counting the desired output lines during each output field, multiplying the count by the line conversion ratio, and selecting the read address in dependence upon the integral part of the resultant.

16. Apparatus for simultaneously enabling different parts of an input video signal to be made available and comprising
    signal storage means, the signal storage means comprising
        a plurality of random access store sections;
        writing means for cyclically writing successive portions of the input video signal relating to successive portions of the video picture into successive random access store sections, using in each cycle write addresses for the different sections which are unambiguously related;
    means for incrementing the write addresses for successive cycles;
    reading means for reading from the sections using for each section read addresses which are related to each other and to the write addresses so as to access a desired set of stored signal portions; and further including
    a counter for counting the desired output during each output field, and a multiplier for multiplying the count by the line conversion ratio, and wherein the reading means selects the read address in dependence upon the integral part of the multiplier output.

17. A method of simultaneously enabling different parts of an input video signal to be made available, using signal storage having a storage capacity of substantially one video field, comprising the steps of
    cyclically writing successive portions of the input video signal relating to successive portions of the video picture into a plurality of successive random access store sections, using in each cycle write addresses for the different sections which are unambiguously related;
    incrementing the write addresses for successive cycles; and
    reading from the sections using for each section read addresses which are related to each other and to the write addresses so as to provide simultaneous access to one stored signal portion only in each store section.

18. A method according to claim 17 wherein each signal portion is a video signal line.

19. A method according to claim 17 wherein the read addresses are so chosen that several successive lines, equal in number to the number of store sections, are made available simultaneously.

20. A method according to claim 17 wherein several outputs read from the store sectons are combined in a weighted addition to provide an interpolated output signal.

21. A method according to claim 17 wherein the weighting is controlled by counting the desired output lines during each output field, multiplying the count by the line conversion ratio, and controlling the weighting in dependence upon the non-integral part of the resultant.

22. Apparatus for simultaneously enabling different parts of an input video signal to be made available and comprising signal storage means, the signal storage means having a storage capacity of substantially one video field and comprising a plurality of random access store sections;

writing means for cyclically writing successive portions of the input video signal relating to successive portions of the video picture into successive random access store sections, using in each cycle write addresses for the different sections which are unambiguously related;

means for incrementing the write addresses for successive cycles; and reading means for reading from the sections using for each section read addresses which are related to each other and to the write addresses so as to provide simultaneous access to one stored signal portion only in each store section.

23. Apparatus according to claim 22, including means for combining several outputs from the store sections in a weighted addition to provide an interpolated output signal.

24. Apparatus according to claim 22, including a counter for counting the desired output lines during each output field, a multiplier for multiplying the count by the line conversion ratio, and means for controlling the weighting performed by the combining means in dependence upon the non-integral part of the multiplier output.

* * * * *